(12) United States Patent
Kirschner

(10) Patent No.: US 6,334,285 B1
(45) Date of Patent: Jan. 1, 2002

(54) HANGER FOR MOUNTING TO I-BEAMS

(75) Inventor: Kraig A. Kirschner, Corona, CA (US)

(73) Assignee: Automatic Fire Control, Inc., South El Monte, CA (US)

( * ) Notice: Subject to any disclaimer, the term of this patent is extended or adjusted under 35 U.S.C. 154(b) by 0 days.

(21) Appl. No.: 09/389,771

(22) Filed: Sep. 2, 1999

(51) Int. Cl.$^7$ .............................. E04B 1/38; E02D 17/00
(52) U.S. Cl. ..................... 52/702; 405/288; 405/259; 248/235; 248/228.1; 249/23
(58) Field of Search ........................ 52/702; 249/23; 248/200, 228.1, 228.6, 235, 500; 405/288, 259

(56) References Cited

U.S. PATENT DOCUMENTS

| | | | | |
|---|---|---|---|---|
| RE14,044 E | * | 1/1916 | Griffin ........................ 248/200 |
| 1,489,474 A | * | 4/1924 | Beckwith ................... 52/489.1 |
| 1,678,506 A | * | 7/1928 | Guillet ................... 248/200 X |
| 1,929,835 A | * | 10/1933 | Awbrey ........................ 72/105 |
| 2,396,174 A | * | 3/1946 | Hawes ........................ 25/131 |
| 2,814,058 A | * | 11/1957 | Hickson ........................... 9/42 |
| 3,245,649 A | * | 4/1966 | Cassidy et al. ............. 248/361 |
| 3,472,475 A | * | 10/1969 | Rudiger ...................... 248/228 |
| 3,626,648 A | * | 12/1971 | Beckham ..................... 52/127 |
| 3,806,074 A | * | 4/1974 | Ward ........................... 248/228 |
| 3,981,469 A | * | 9/1976 | Torbet et al. ............... 248/235 |
| 3,993,279 A | * | 11/1976 | Holt ............................ 248/235 |
| 4,601,616 A | * | 7/1986 | Barish et al. ............... 405/288 |
| 4,679,967 A | * | 7/1987 | Hipkins, Sr. et al. ....... 405/288 |
| 4,699,547 A | * | 10/1987 | Seegmiller .................. 405/288 |
| 4,846,433 A | * | 7/1989 | Courtois et al. ............ 248/235 |
| 4,960,348 A | * | 10/1990 | Seegmiller .................. 405/259 |
| 5,160,211 A | * | 11/1992 | Gilb ............................ 403/213 |
| 5,755,535 A | * | 5/1998 | Fox ............................. 405/288 |
| 5,897,088 A | | 4/1999 | Kirschner ................... 248/300 |
| 5,947,424 A | * | 9/1999 | Heath .......................... 248/58 |
| 5,947,431 A | * | 9/1999 | Kiggins ...................... 248/200 |
| 6,061,989 A | * | 5/2000 | Trivedi et al. ............... 52/633 |
| 6,082,560 A | * | 7/2000 | Timm ..................... 211/90.01 |

* cited by examiner

Primary Examiner—Alvin Chin-Shue
Assistant Examiner—Khoa Tran
(74) Attorney, Agent, or Firm—Lyon & Lyon LLP

(57) ABSTRACT

A hanger for an I-beam includes two brackets positioned over the lower flange of the I-beam and tied together by tie-rods. The brackets each include a base section with a mounting section at 90° thereto on one side and an engagement section at an obtuse angle on the other. A channel is formed on each bracket to accommodate an edge of the I-beam flange. The tie-rods are juxtaposed with the mounting section and also constrain the head of a bolt extending through the mounting section against rotation. The threaded shaft of the bolt provides an equipment mount for the I-beam.

12 Claims, 1 Drawing Sheet

HANGER FOR MOUNTING TO I-BEAMS

BACKGROUND OF THE INVENTION

The field of the present invention is mounting devices for steel construction.

Steel construction often requires the hanging of various construction components such as pipes, from the basic steel structure. I-beams in such construction typically are not conveniently or economically modified through drilling, welding or the like to provide attachment for such components. Consequently, it is advantageous to provide clamping mechanisms, which can, without modifying the beam, rigidly support a mounting from the beam. Such clamping mechanisms frequently are adjustable to accommodate the variations in such beams and avoid the need for excessive stock. An adjustable clamping mechanism providing a mounting is illustration in U.S. Pat. No. 5,897,088, the disclosure of which is incorporate herein by reference.

SUMMARY OF THE INVENTION

The present invention is directed to a hanger for an I-beam. Two brackets are drawn together on the beam by tie-rods. A mounting is associated with the brackets to hang depending equipment. The hanger accommodates a large variety of beam sizes and shapes.

In a first separate aspect of the present invention, the two brackets include plates each formed to define a base section, a mounting section adjacent and perpendicular to the base section and an engagement section adjacent and extending at an obtuse angle from the base section. A channel is formed thereby. A mounting includes a threaded shaft which extends perpendicularly from the mounting. Tie-rods adjustable in length extend between the base sections on the two brackets.

In a second separate aspect of the present invention, the base sections each include tie-rod holes therethrough. The tie-rods extend through the tie-rod holes in each base with the channels of the two brackets facing one another. The tie-rods are adjustable for accommodating the size of the beam to which the hanger is to be attached.

In a third separate aspect of the present invention, the mounting sections have mounting holes therethrough and a bolt in the mounting holes. The bolts have heads each having opposed flat sides. The tie-rods are spaced to receive the bolt heads there between with the flat sides juxtaposed with the tie-rods to interfere with rotation of the bolts.

In a fourth separate aspect of the present invention, the foregoing aspects are contemplated to be used in combination to further advantage.

Accordingly, it is an object of the present invention to provide an improved hanger for mounting to I-beams. Other and further objects and advantages will appear hereinafter.

DETAILED DESCRIPTION OF THE PREFERRED EMBODIMENTS

Figure 1:
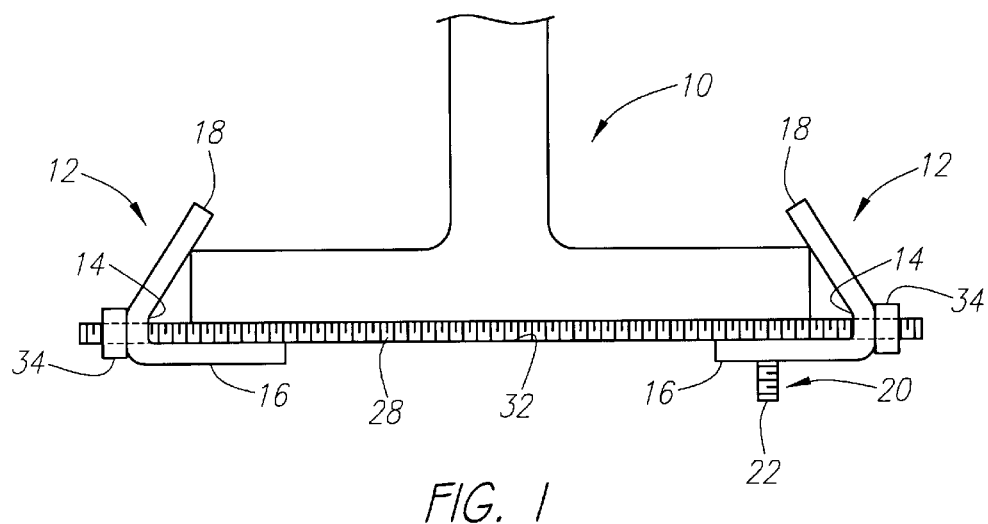
FIG. 1 is a side view of a hanger mounted to an I-beam.
Figure 2:
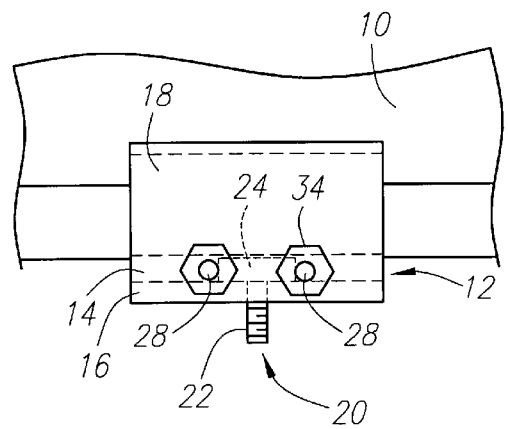
FIG. 2 is an end-view of the hanger mounted to an I-beam.

Turning in detail to the drawing, a typical I-beam 10 is illustrated. In FIGS. 1 and 2, a hanger is tightly fixed to the lower flange of the I-beam 10. The I-beam is contemplated in this embodiments to serve as a structural element in steel construction framing. The hanger would, under such utility, support a bracket, clamp or the like which in turn might support a utility conduit, a false ceiling or other construction element.

The hanger shown tightly gripping the I-beam includes two brackets, generally designated 12. These brackets 12 are preferably identical and are each formed from a plate, thereby defining a formed plate means. This unitary plate may be thought of as formed into three portions, a base section 14, a mounting section 16 and an engagement section 18. The three sections 14–18 define a channel. The mounting section 16 is formed to be substantially perpendicular to the adjacent base section 14. The engagement section 18 extends at an obtuse angle from the adjacent base section 14. This obtuse angle is not critical as to exact degree. Rather, function dictates the range of angles preferred. As the angles approaches 90°, the bracket 12 loses its advantage in accommodating various flange thicknesses on the supporting I-beam 10. As the obtuse angle approaches 180°, the bracket ceases to provide an overlapping engagement with the I-beam flange.

A mounting, generally designated 20, is associated with the mounting section 16 of at least one of the brackets 12. The mounting 20 includes a bolt having a threaded shaft 22 and a head 24. The head 24 includes opposed flat sides, typically a standard hexagonal head. The bolt extends through a mounting hole 26 in the mounting section 16. The head 24 thus is positioned on the inside of the bracket 12, while the threaded shaft 22 extends outwardly of the bracket 12, or away from the engagement section 18.

Tie-Rods 28 extend between the two brackets 12. The base section 14 of each of the brackets 12 includes two tie-rod holes 30. The tie-rods 28 each include a threaded shaft 32 with nuts 34 on either end. Devices for retaining the nuts 34 may be employed where vibrations may be encountered. Locking nuts and additional jam nuts are contemplated.

The tie-rods 28 are spaced apart by virtue of the locations of the tie-rod holes 30. This spacing is preferably arranged so that the opposed flat sides on the head 24 of the bolt will be juxtaposed with the tie-rods 28 such that the tie-rods 28 interfere with rotation of the bolt head 24.

Figure 3:
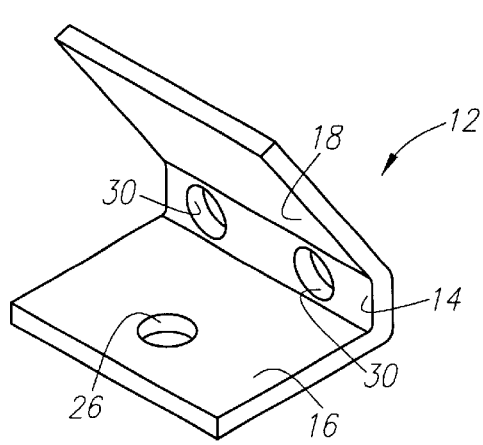
FIG. 3 is a perspective view of a bracket employable in the hanger.

As can be seen from FIG. 3, the brakes in the plate between the three sections 14–18 may not be without some compromise. In FIG. 3, the base section 14 is shown to be slightly curved as a result of the formation and may, indeed, be almost continuous with the adjacent base section 14 and engagement section 18.

In operation, the hanger is assembled and located in place on the I-beam 10. The nuts 34 are tightened on the tie-rods 28. As the channels of the brackets 12 each includes the obtuse angle on the engagement section, a large range of I-beam flange thickness can be accommodated. The total width of the beam may also be easily accommodated because of the adjustable nature of the tie-rods 28. As the hanger is tightened, the brackets 12 tend to rotate so that the mounting sections 16 come up against the tie-rods 28. This orients the brackets 12 such that the threaded shaft 22 of the mounting 20, extends substantially normal to the lower flange of the I-beam 10. To accomplish this, it is advantageous that the tie-rod holes 30 are located close to touching the inner plane of the mounting section 16. The tie-rod holes 30 are also preferable not oversized.

Accordingly, an advantageous hanger for steel construction is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A hanger for an I-beam, comprising two brackets, each bracket includes a plate formed to define a base section, a mounting section adjacent and perpendicular to the base section and an engagement section adjacent to and extending at an obtuse angle from the base section, the engagement section, the base section and the mounting section defining a channel;

a mounting in at least one of the mounting sections, each mounting including a threaded shaft extending perpendicularly from the mounting and away from the engagement section; and tie-rods adjustable in length extending between the base sections on the two brackets and juxtaposed with the mounting section.

2. The hanger of claim 1, each base section including tie-rod holes therethrough, each tie-rod extending through one tie-rod hole in each base section with the channels of the two brackets facing one another.

3. A hanger for an I-beam, comprising two brackets, each bracket includes a plate formed to define a base section, a mounting section adjacent and perpendicular to the base section and an engagement section adjacent to and extending at an obtuse angle from the base section, the engagement section, the base section and the mounting section defining a channel;

a mounting in at least one of the mounting sections, each mounting including a threaded shaft extending perpendicularly from the mounting and away from the engagement section; and tie-rods adjustable in length extending between the base sections on the two brackets and juxtaposed with the mounting section, the mounting section having a mounting hole therethrough, the threaded shaft being a bolt in the mounting hole, the bolt having a head with opposed flat sides, the tie-rods being spaced to receive the bolt head therebetween with the flat sides juxtaposed with the tie-rods to interfere with rotation of the bolt.

4. A hanger for an I-beam, comprising two brackets, each bracket includes a plate formed to define a base section, a mounting section adjacent and perpendicular to the base section and an engagement section adjacent to and extending at an obtuse angle from the base section, the engagement section, the base section and the mounting section defining a channel; and a mounting in at least one of the mounting sections, each mounting including a threaded shaft extending perpendicularly from the mounting and away from the engagement section;

tie-rods adjustable in length extending between the base sections on the two brackets and juxtaposed with the mounting section, each base section including tie-rod holes therethrough, each tie-rod extending through one tie-rod hole in each base section with the channels of the two brackets facing one another, the mounting section having a mounting hole therethrough, the threaded shaft being a bolt in the mounting hole, the bolt having a head with opposed flat sides, the tie-rods being spaced to receive the bolt head therebetween with the flat sides juxtaposed with the tie-rods to interfere with rotation of the bolt.

5. A hanger for an I-beam, comprising two brackets, each bracket includes a formed plate means for gripping the I-beam and defining a base section, a mounting section adjacent and perpendicular to the base section and an engagement section adjacent to and extending at an obtuse angle from the base section, the engagement section, the base section and the mounting section defining a channel;

a mounting in at least one of the mounting sections, each mounting including a threaded shaft extending perpendicularly from the mounting and away from the engagement section; and tie-rods adjustable in length extending between the base sections on the two brackets and juxtaposed with the mounting section.

6. The hanger of claim 1, each base section including tie-rod holes therethrough, each tie-rod extending through one tie-rod hole in each base section with the channels of the two brackets facing one another.

7. The hanger of claim 1, the mounting section having a mounting hole therethrough, the threaded shaft being a bolt in the mounting hole, the bolt having a head with opposed flat sides, the tie-rods being spaced to receive the bolt head therebetween with the flat sides juxtaposed with the tie-rods to interfere with rotation of the bolt.

8. A hanger for an I-beam, comprising two brackets, each bracket includes a formed plate means for gripping the I-beam and defining a base section, a mounting section adjacent and perpendicular to the base section and an engagement section adjacent to and extending at an obtuse angle from the base section, the engagement section, the base section and the mounting section defining a channel; and a mounting in at least one of the mounting sections, each mounting including a threaded shaft extending perpendicularly from the mounting and away from the engagement section;

tie-rods adjustable in length extending between the base sections on the two brackets and juxtaposed with the mounting section, each base section including tie-rod holes therethrough, each tie-rod extending through one tie-rod hole in each base section with the channels of the two brackets facing one another, the mounting section having a mounting hole therethrough, the threaded shaft being a bolt in the mounting hole, the bolt having a head with opposed flat sides, the tie-rods being spaced to receive the bolt head therebetween with the flat sides juxtaposed with the tie-rods to interfere with rotation of the bolt.

9. A hanger for an I-beam, comprising two brackets, each bracket includes a plate formed to define a base section, a mounting section adjacent and perpendicular to the base section and an engagement section adjacent and extending at an obtuse angle from the base section, the engagement section, the base section and the mounting section forming a channel;

a mounting in at least one of the mounting sections, each mounting including a threaded shaft extending perpendicularly from the mounting and away from the engagement section;

tie-rods adjustable in length extending perpendicularly to and between the base sections on the two brackets and juxtaposed with the mounting section.

10. The hanger of claim 9, each base section including tie-rod holes therethrough, each tie-rod extending through one tie-rod hole in each base with the channels of the two brackets facing one another.

11. The hanger of claim 9, the mounting section having a mounting hole therethrough, the mounting having a bolt in the mounting hole, the bolt having a head with opposed flat sides, the tie-rods being spaced to receive the bolt head there between with the flat sides juxtaposed with the tie-rods to interfere with rotation of the bolt.

12. A hanger for an I-beam, comprising two brackets, each bracket includes a plate formed to define a base section, a mounting section adjacent and perpendicular to the base section and an engagement section adjacent and extending at an obtuse angle from the base section, the engagement section, the base section and the mounting section forming a channel;

a mounting in at least one of the mounting sections, each mounting including a threaded shaft extending perpendicularly from the mounting and away from the engagement section;

tie-rods adjustable in length extending perpendicularly to and between the base sections on the two brackets and juxtaposed with the mounting section, each base section including tie-rod holes therethrough, each tie-rod extending perpendicularly through one tie-rod hole in each base with the channels of the two brackets facing one another, the mounting section having a mounting hole therethrough, the mounting having a bolt in the mounting hole, the bolt having a head with opposed flat sides, the tie-rods being spaced to receive the bolt head there between with the flat sides juxtaposed with the tie-rods to interfere with rotation of the bolt.

* * * * *